Sept. 8, 1953

T. E. LARKIN 2,651,327

LIQUID FILLED EXPANSIBLE CHAMBER

Filed March 30, 1946

Inventor:
Thomas E. Larkin,
by Prowell S. Mack
His Attorney.

Patented Sept. 8, 1953

2,651,327

UNITED STATES PATENT OFFICE 2,651,327

LIQUID FILLED EXPANSIBLE CHAMBER

Thomas E. Larkin, Schenectady, N. Y., assignor to General Electric Company, a corporation of New York Application March 30, 1946, Serial No. 658,528

1 Claim. (Cl. 137—781)

This invention pertains to expansible chambers, specifically to flexible, corrugated bellows used as pressure responsive devices in measuring and regulating apparatus. The invention relates particularly to a flexible bellows, or similar expansible chamber, having an internal dashpot arrangement and being filled with a liquid of particular qualities to secure vibration damping characteristics. My invention is especially applicable to regulators responsive to ambient atmospheric pressure, or some other pressure condition. It has been found particularly effective in regulators for turbosuperchargers used in connection with internal combustion engines in aircraft.

An object of my invention is to provide an improved expansible chamber for use as a pressure responsive device, which will give stable, sensitive, and reliable performance when subjected to extreme vibration conditions sufficient to render useless the devices known to the prior art.

A further object is to provide a pressure responsive flexible bellows having means for damping high frequency vibrations.

A still further object is to provide a pressure-responsive bellows having internal dash-pot means and filled with a stable liquid of substantially constant viscosity, negligible vapor pressure, and good adhesive and cohesive properties, which qualities are not impaired by either sub-zero or elevated temperatures or violent agitation or prolonged contact with metals.

Another object is to provide an evacuated bellows having inside it a vibration-damping dash-pot and filled with a liquid which has good "tensile strength" over a very wide range of operating conditions, such as those encountered in aircraft operation.

Another object is to provide a pressure-responsive chamber of the type described which will operate effectively for all orientations of the device in space.

Still another object is to provide a simple and effective method of loading an expansible chamber with a gas-free, non-vaporizable liquid.

Still another object is to provide a friction-free bellows system having extreme sensitivity of response not obtainable with devices known to the prior art.

Figure 1:
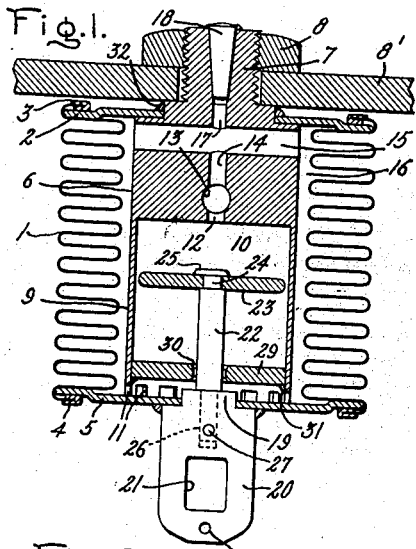
Figure 3:
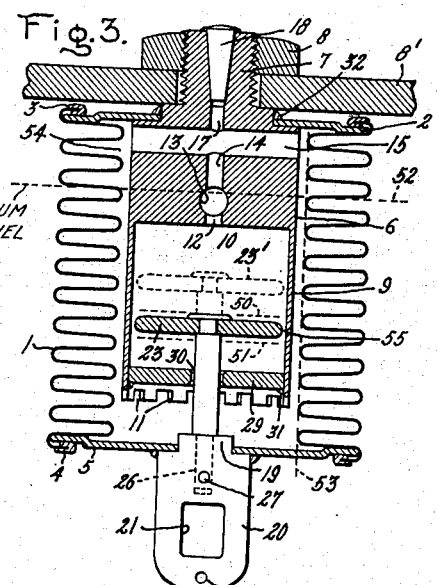
Figure 2:
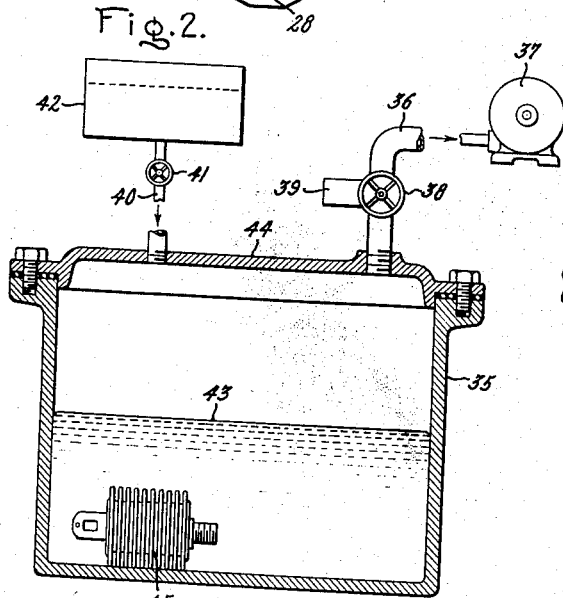
Figure 5:
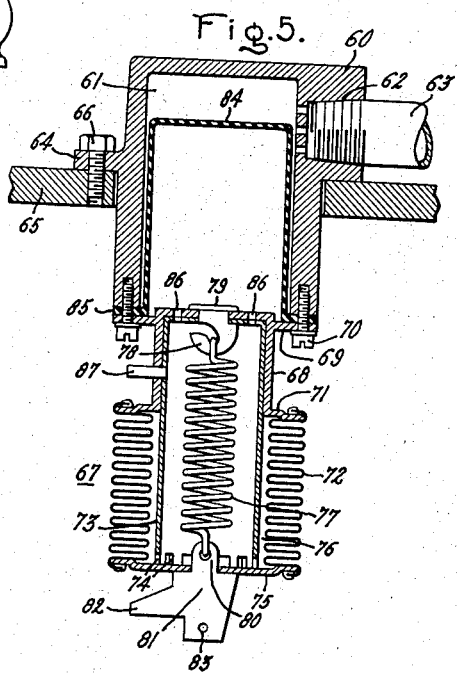
Figure 4:
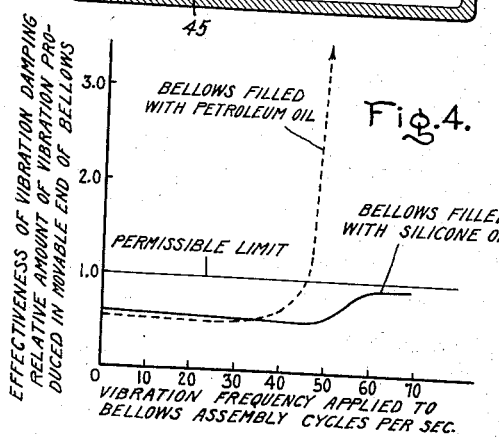

Other objects and advantages will become apparent from a consideration of the following description taken in connection with the accompanying drawings, in which Fig. 1 is a sectional view of an evacuated liquid-filled, sealed bellows embodying the invention; Fig. 2 is a diagrammatic representation of the apparatus for filling with liquid devices made in accordance with the invention; Fig. 3 is a view of the device of Fig. 1 in extended position; Fig. 4 is a graphical representation of the vibration damping characteristics obtained with the invention; and Fig. 5 is a sectional view of another form of pressure-responsive device embodying the invention.

Referring now to Fig. 1, my invention is disclosed as embodied in a flexible sealed bellows for use as a pressure responsive device in aircraft powerplant regulators. It may, for instance, be used in regulators of the types disclosed in Patent 2,376,144, issued May 15, 1945, on an application Serial No. 518,532, filed January 17, 1944, in the name of Martin Levine, or application Serial No. 605,960, filed July 19, 1945, now Patent No. 2,622,393, issued December 23, 1952, in the names of M. A. Edwards, H. M. Ogle, and D. E. Garr.

The device of Fig. 1 consists of a flexible corrugated bellows 1, which may be made of any suitable metal such as copper, Phosphor bronze, or a stainless steel. At one end the bellows is spun over and silver soldered or brazed at 3 to an annular end plate 2. Similarly, at the other end the bellows is secured at 4 to end plate 5.

Contained within the bellows is a cylindrical member 6 which serves a number of purposes. At one end, the member 6 is provided with a central axial extension 7 of reduced diameter, threaded to receive a nut 8. This serves to secure the bellows assembly to a support, such as the member 8', which may be a wall of the regulator housing or a suitable bracket.

At the other end of member 6, a cylindrical, axially extending wall 9 defines the sides of a dash-pot chamber 10. The extreme end of wall 9 is provided with a plurality of cut-outs 11, which serve as communicating passages between the spaces inside and outside of wall 9 when end plate 5 is in retracted position and resting against the end of wall 9, as shown in Fig. 1. The upper portion of chamber 10 communicates with the space 16 between the bellows 1 and member 6, by way of an orifice 12, a first transverse passage 13, an axial hole 14, and a second transverse hole 15, at right angles to hole 13. An axle hole 17 is provided in the extension 7 for evacuating and filling the bellows with liquid, as more particularly described hereinafter. A tapered plug 18, which may be silver soldered in place, serves as a closure for this opening.

The end plate 5 has a central opening into which projects portion 19 of a flat terminal member 20. This member is adapted to engage or be connected to a lever or other member (not shown) which may project through opening 21 so as to be positioned by the pressure changes to which the bellows is responsive. In some applications a suitable biasing spring (not shown) may be hooked through the hole 28 in member 20. Such an arrangement is disclosed in the above-mentioned Levine patent.

Secured to terminal member 20 is a piston rod 22 carrying a piston 23 located within the dashpot chamber 10. The piston may be carried on a reduced end portion 24 of rod 22, which is riveted or spun over the piston as indicated at 25. The other end of rod 22 is shown as being connected to member 20 by an extension 26 projecting into a hole in member 20 and a transverse pin 27 silver soldered to provide a seal.

The end wall of the dashpot chamber 10 is formed by a disc 29 which has a central opening defining a carefully selected clearance space 30 with the piston rod 22. The area of clearance 30 is preferably of the same order of magnitude as that of orifice 12. While the exact size of these orifices must be determined for each case, depending on the characteristics of the liquid filling used, the operating temperature range to be encountered, the nature of the vibrations to which the device is subjected, the degree of vibration damping desired, and similar factors, it may be stated by way of example that with a bellows 1½ inches in outside diameter and a piston rod of .125 inch diameter, the hole in disc 29 may be about .187 inch diameter.

As will be seen from Fig. 1, there is also an appreciable clearance space defined between piston 23 and the wall 9. With a dashpot chamber of roughly ¾ inch diameter, there may be a clearance space of about .014 inch on the diameter of the piston.

With such comparatively generous clearances between the piston and wall 9, and between the piston rod and end disc 29, it will be apparent that there will be no rubbing contact between the movable piston assembly and the dashpot, even though the end plate 5 should tilt slightly relative to the axis of the bellows. This absence of rubbing friction is an important factor in obtaining the extremely sensitive and reliable operation required in regulators for aircraft powerplants.

In assembling the device of Fig. 1, the end plate 2 is soldered to cylinder 9 at 32. Next the bellows 1 is lead soldered to the plate 2 at 3. After the piston 23 is riveted to piston rod 22, the cylinder end plate 29 is placed over the piston rod. The rod is then fastened to parts 5 and 20, which have been silver soldered together by a previous operation. The complete piston and end plate assembly is then positioned with the piston in cylinder 9, and disc 29 in the end of cylinder 9. Disc 29 is then lead soldered at 31. After this the bellows end is spun over end plate 5 and soldered at 4 to complete the assembly.

The characteristics of the liquid used in the device are of the utmost importance in the practice of my invention. To be practical and successful in damping vibration in the intended manner, the liquid must have the following qualities: (1) adhesive and cohesive properties giving it good "tensile strength"; (2) a vapor pressure so low as to be negligible; (3) chemical and physical stability over a wide temperature range when in contact with metals, and when subjected to violent agitation; (4) viscosity of the correct value, remaining substantially constant over the range of operating conditions to be encountered; (5) at least fair lubricating properties.

While the phenomenon of "tensile strength" in liquids is not entirely understood, it appears to depend on the tendency of the liquid to adhere to the surface of solid bodies it contacts and on the tendency of the liquid molecules to cohere to each other, as evidenced by the "film strength" of the liquid. The tensile strength is greatly affected by the vapor pressure of the liquid, and by the presence of entrained or dissolved gases. If it has an appreciable vapor pressure, or contains entrained gases, then the liquid will not be "solid" but "porous," containing minute voids filled with gases. In this condition the liquid has a much smaller tensile strength than when entirely free of these gas pockets.

Ordinary liquids, such as petroleum oils, used in hydraulic applications have a tendency to decompose, forming acids, sludges, and other decomposition products, particularly when subjected to elevated temperatures and in contact with certain metals. These decomposition products have a serious effect on the vapor pressure and tensile strength of the liquid, and may cause deterioration of metal parts in contact with the liquid.

I have discovered that certain of the liquids known as "silicone oils" meet admirably the requirements outlined above. These are complex mixtures of polymers of methyl (or ethyl) polysiloxanes, having a high molecular weight, low vapor pressure, extraordinary stability, remarkably constant viscosity, and good lubricating properties. They are available in a wide range of viscosities, so that just exactly the right one can be selected for a given design of bellows assembly. For use in connection with my invention, a silicone oil known as a "non-volatile" type is chosen. This is an oil which has had all the volatile constituents carefully removed. The vapor pressure of such an oil may be less than 1 mm. of mercury at 160 degrees Fahrenheit, decreasing at lower temperatures to values so small they can be measured only with great difficulty.

A particular silicone oil which has been found satisfactory is that known to those skilled in the art as GE #9981-LT-70NV. This oil flows freely at temperatures in the neighborhood of −100° F., has negligible vapor pressure at temperatures up to 300° F., and exhibits little change in viscosity over that range of temperatures. It will not vaporize even when subjected to vibration at a frequency of 700 cycles per second at a temperature of 300° F. in a vacuum.

Referring now to Fig. 2 of the drawings, the method of loading the bellows assembly with gas-free silicone oil of the type described above is as follows. While only one bellows assembly 45 is shown, it will be understood that any desired number are placed in the vacuum chamber 35, which is then sealed and evacuated through conduit 36 by a suitable vacuum pump 37. A three-way valve 38 permits the interior of vessel 35 to be connected either to pump 37 or to the atmosphere through vent 39. During the evacuation process the conduit 40, connected to oil reservoir 42, is kept sealed off by closing valve 41. After operation of pump 37 for a number of hours, the space inside chamber 35 will be reduced to a very low pressure, of the order of 20 microns of mercury, absolute. Then, with the vacuum pump still operating, valve 41 is opened to permit oil from reservoir 42 to enter the chamber 35 at a slow rate. As the oil enters, any gases dissolved or entrained in the liquid are separated and drawn off by the pump. This supply of oil is continued until the level in the chamber 35 rises above the bellows assemblies therein, for instance to the level indicated at 43. The valve 41 is then closed, and valve 38 is actuated to admit atmospheric pressure through vent 39 to the interior of chamber 35. Atmospheric pressure, acting on the surface of the oil will force the liquid to fill the bellows assemblies completely. The cover 44 can then be removed from chamber 35, the bellows 45 carefully removed without spilling any oil, and tapered plug 18 (Figure 1) inserted and sealed by soldering, or other suitable means. Or the bellows may be held in vertical position, beneath the surface of the liquid, and the plug pressed into place. If the end plate 5 is not seated against the end of cylinder 9, an additional external force may be applied to terminal member 20 to compress the bellows so that plate 5 does seat on member 6, some of the oil inside the bellows being thereby squeezed out through hole 17. The plug 18 is then assembled as indicated above.

The method of operation of an evacuated, liquid-filled bellows made in accordance with my invention can be seen by reference to Fig. 3, which represents the bellows assembly of Fig. 1 drawn out to its maximum extension by the pressures to which it is subjected. The original position of piston 23 is indicated by dotted lines at 23'.

It will be noted that with this full extension, the level of the oil drops to the plane indicated at 52, in which condition the oil still has free access to the top side of piston 23 by way of passage 13 and orifice 12. It is an important feature of the construction of this bellows assembly that the configuration of the assembly in retracted and extended conditions, the volume of oil contained therein, and the location and arrangement of the orifices 30 and 12 and of the access openings 11, 13, 14, and 15 are carefully correlated so that, for all degrees of extension of the bellows and for all orientations or attitudes of the assembly in space, both orifice 30 and orifice 12 will be flooded so that oil will always be freely supplied to both sides of piston 23. If the bellows assembly is turned 90 degrees so that the right-hand side is uppermost, then the oil level will be roughly as indicated by dotted line 53 in Fig. 3. Likewise for all possible inclinations of the axis of the assembly, oil has access to both sides of the piston, regardless of the extension of the bellows.

With the assembly vertical, as shown in Fig. 3, and the oil level at 52, the space 54 above the oil will of course be evacuated. It can now be seen why it is particularly necessary that the liquid used in this evacuated assembly have a negligible vapor pressure, for any volatile constituents would separate from the liquid and occupy the space 54 above the liquid, whereupon the bellows would no longer act as an evacuated chamber. It will be understood by those skilled in the art that any appreciable change in the degree of vacuum maintained in the space 54 would alter the operating characteristics of the assembly enough to destroy its utility as a sensitive pressure responsive device for the regulators of aircraft powerplants.

For the purpose of illustrating the vibration damping action of the assembly, let it be assumed that the entire unit is subjected to vibration tending to cause the piston 23 to vibrate from the position indicated by dotted line 50 to that of line 51 in Fig. 3. When the piston moves downward to position 51, oil is pushed or pumped through orifice 30. Of course some oil is also forced around the piston through the restricted clearance space 55. This oil movement absorbs work energy and tends to resist motion of the piston. This action is similar to that occurring in dashpot arrangements known to the prior art. However, by use of the particular liquid described above, there is obtained an additional damping action not obtained with other liquids used in the past. This action results from the fact that when piston 23 moves downward, the silicone oil tends to adhere strongly to the top surface of the piston; and, because of the good tensile strength of the liquid, a "filament" of the liquid is pulled through the orifice 12 and passages 13, 14, 15. This oil movement also represents an absorption of work energy, which further tends to dampen vibration of the piston. Similarly when piston 23 moves upward, oil is pushed out through orifice 12 and pulled in through orifice 30. Thus with my invention there is obtained a dual vibration damping action, which has been found to give far superior results to any possible with prior art arrangements.

It will be observed that if piston 23 moved suddenly upward to position 50, then with a liquid not having the "adhesive" properties of silicone oils, there would be a tendency for a small evacuated space to form on the underside of the piston, because of the inertia of the liquid. The only force tending to cause oil to flow in and occupy this void would be the static head of the oil above. (Since space 54 is evacuated there is no gas pressure acting on the surface 52.) This static head is insufficient to cause the liquid to follow the piston when subjected to high frequency vibrations, such as those encountered in aircraft installations of reciprocating internal combustion engines. I believe that the inability of prior art devices, filled with ordinary hydraulic oils having petroleum bases, to dampen high frequency vibrations is largely due to the fact that the motion of the dashpot piston merely creates a small local vacuum, within which it vibrates freely without doing any energy-absorbing work on the liquid. My invention operates in a different manner as described above to produce results not possible heretofore.

The improvement in performance obtained with my invention is indicated graphically in Fig. 4, in which the abscissa is the vibration frequency to which the whole bellows assembly is subjected. The ordinate is an arbitrary scale indicating the effectiveness of the vibration dampening achieved, in terms of the amount of vibration of the movable end of the bellows relative to the fixed end. The curves shown represent qualitatively the results obtained in tests with one end of the assembly fixed, as in Figs. 1 and 3.

The broken curve in Fig. 4 represents the performance of a previously known commercial liquid-filled bellows. It will be observed that the vibration damping action broke down completely at an applied frequency of about 45 cycles per second. The solid curve indicates the vastly improved action obtained with a bellows made and filled with a liquid in accordance with the present invention, the vibration never exceeding the permissible limit throughout the range investigated.

Particular attention is directed to the fact that my evacuated bellows assembly is carefully designed to eliminate all sliding metal-to-metal friction. Both the clearance between piston 23 and cylinder 9 and clearance space 30 around rod 22 are sufficiently generous to eliminate the possibility of mechanical contact. The stiffness of bellows 1 serves to keep the piston and rod assembly properly centered in the dashpot cylinder. If a tension spring (not shown) is hooked into hole 28, it will also tend to keep the piston centered. My frictionless bellows assembly is found to be far more sensitive, accurate, and reliable than prior art devices, many of which have deliberately introduced sliding friction forces for their vibration damping effect. While it is true that sliding friction does have a considerable vibration damping effect, it is an unreliable and erratic effect, depending greatly on the mechanical condition of the rubbing surfaces and on the lubrication supplied thereto. With devices of the type described herein, it may well happen that for some operating conditions such friction damping means would be flooded with liquid, and for other orientations of the device in space or with other conditions the friction dampener would be dry. The vibration damping effect produced in the two cases might well be vastly different. With my invention I secure vibration damping qualities far better than obtainable with prior art arrangements, without resort to such unreliable expedients as friction damping.

While my invention has been described as applied to an evacuated bellows assembly, it is also applicable to expansible chambers intended to respond to super-ambient pressures inside the bellows. Such an assembly is shown in Fig. 5. This consists of a housing 60 having an internal chamber 61 opening through one end of the housing, a tapped opening 62 for receiving a pressure sensing conduit 63, and a flange 64 for mounting the assembly to a wall or support bracket 65, by means of suitable threaded fastenings 66. Secured to the open end of housing 60 is a bellows assembly represented generally at 67, and consisting of a cylinder 68 with a first end flange 69 adapted to be secured to housing 60 by threaded fastenings 70, in a manner which will be obvious from the drawing. At the opposite end of cylinder 68 is a second flange 71, to which is soldered one end of flexible metal bellows 72. Inside member 68, and projecting into the bellows, is a cylindrical cup having an upper closed end secured to member 68 and a lower open end which serves as a stop for the end plate 75 soldered to the lower end of bellows 72. Cut-outs 74 serve to provide communication between the space inside cup 73 and the space 76 between cup and bellows, when end plate 75 is resting against the end of cup 73 as shown in Fig. 5.

Inside cup 73 is a tension spring 77 connected at one end to housing 68 and cup 73 by hook member 78. An end portion of hook 78 projects through both cup 73 and housing 68 and is riveted or spun over at 79 so as to serve the additional function of securing cup 73 to housing 68. The other end of spring 77 is connected to terminal fitting 81 through a portion 80 which projects through a central opening in end plate 75 and is soldered or brazed thereto. Fitting 81 is provided with a finger 82, which may be engaged by a lever (not shown) to be positioned by the bellows assembly, and a hole 83 into which may be hooked an exterior biasing spring (not shown) in the manner suggested in connection with Figs. 1 and 3.

Arranged in chamber 61 is a flexible cup-shaped diaphragm 84 which has a flange portion 85 surrounding its open end and projecting between the end of housing 60 and the attachment flange 69 of housing 68. The diaphragm 84 may be made of any suitable material, such as a synthetic rubber like "neoprene". It will be apparent that flange 85 serves the dual purpose of a support for the cup 84 and a gasket for sealing the joint between housings 60 and 68. Both the cup 84 and bellows assembly 67 are completely filled with an oil of the type described above in connection with the bellows assembly of Figs. 1 and 3.

The space inside the bellows assembly 67 communicates with the interior of flexible cup 84 by way of one or more holes 86 drilled through the housing 68 and cup 73. The aggregate area of holes 86 is chosen so as to restrict the flow of liquid from the bellows assembly 67 into cup 84, and vice versa. This restriction determines the rate at which bellows 67 will respond to changes in the control pressure communicated to chamber 61 through conduit 63. It also provides vibration damping by work energy consumed in pulling and pushing filaments of oil through the orifices 86, as in the case of the evacuated type of bellows assembly.

Bellows assembly 67, and cup 84, may be filled with gas-free silicone oil by the same process described above, a small tube 87 serving as the filler opening. After filling, the tube 87 may be pinched shut and sealed, as by soldering.

The method of operation of this pressure-sensing bellows will be apparent from the above description. The pressure to be sensed is communicated through conduit 63 to chamber 61, where it acts to compress the flexible cup 84, imposing a like pressure on the oil inside the cup. Any differential between the pressures in cup 84 and bellows 67 respectively will cause oil to be forced at a comparatively slow rate through orifices 86. An increase in pressure inside bellows 67 will cause expansion, moving end plate 75 away from the end of cup 73 and positioning fitting 81 and any levers or other control elements associated therewith. Thus it will be seen that this is a device for positioning member 81 in accordance with a control pressure communicated to the device through conduit 63, having certain pulsation preventing and vibration damping characteristics.

It will be seen that I have provided expansible chamber arrangements which are simple and cheap to construct, are capable of accurately and effectively responding to atmospheric or super-atmospheric pressures, and have vibration damping qualities unknown to the prior art.

While I have described only two specific embodiments of my invention, it will be understood by those skilled in the art that the invention has many other applications to expansible chambers of other mechanical arrangements, and to other uses in addition to those suggested herein. I intend that the scope of my invention be limited only by the following claim.

What I claim as new and desire to secure by Letters Patent of the United States is:

A pressure-responsive device comprising a housing defining a chamber opening through one end thereof, a flexible wall member in the chamber and having an edge portion secured to the housing around said opening, the flexible member dividing the chamber so as to define separate first and second chamber portions, the wall of the housing defining a second opening arranged to communicate a control pressure to the first chamber portion, and a flexible bellows assembly secured to the housing around the first opening, said assembly comprising a first cylindrical member having a flange at one end for securing the assembly to the housing and a second flange at the other end, a bellows with one end sealed to the second flange and the other end sealed to a movable end member adapted to engage a member to be positioned by the device, a wall forming a partition separating the second chamber portion from the interior of the bellows assembly and having at least one orifice providing a restricted passage communicating therebetween, and a second cylindrical member arranged within and secured to the first cylindrical member, said second cylindrical member projecting into the bellows and having an end portion adapted to serve as a stop defining the fully retracted position of the movable member, the bellows assembly and the second chamber portion being completely filled with a gas-free liquid of good tensile strength and substantially zero vapor pressure.

THOMAS E. LARKIN.

References Cited in the file of this patent

UNITED STATES PATENTS

| Number | Name | Date |
|---|---|---|
| 1,252,535 | Baudry | Jan. 8, 1918 |
| 1,313,877 | Burnham | Aug. 26, 1919 |
| 1,508,391 | Greenwood | Sept. 16, 1924 |
| 1,579,635 | Blick | Apr. 6, 1926 |
| 1,918,699 | Gruss | July 18, 1933 |
| 2,333,401 | Woods | Nov. 2, 1943 |

FOREIGN PATENTS

| Number | Country | Date |
|---|---|---|
| 834,242 | France | Nov. 16, 1938 |

OTHER REFERENCES

"Silicones-high polymeric substances," Modern Plastics, November 1944, pages 124, 125, 126, 212, and 214. Published by Modern Plastics Inc., 122 E. 42d St., New York, N. Y.